US006126822A

United States Patent [19]

Ostermeier et al.

[11] Patent Number: 6,126,822

[45] Date of Patent: Oct. 3, 2000

[54] SUCTION AND DISCHARGE APPARATUS FOR DRILLING FLUID

[75] Inventors: Peter Ostermeier, Diessen; Wolfgang Erdt, Martinsried; Peter Roth, Grabs, all of Germany

[73] Assignee: Hilti Aktiengesellschaft, Schaan, Liechtenstein

[21] Appl. No.: 09/265,471

[22] Filed: Mar. 10, 1999

[30] Foreign Application Priority Data

Mar. 13, 1998 [DE] Germany .......................... 198 10 912

[51] Int. Cl.[7] .................................................. B01D 21/24

[52] U.S. Cl. ...................... 210/172; 210/257.1; 210/258; 210/416.1; 210/532.1; 210/299

[58] Field of Search ............................... 210/172, 257.1, 210/258, 259, 299, 416.1, 498, 532.1

[56] References Cited

U.S. PATENT DOCUMENTS

| | | | |
|---|---|---|---|
| 206,632 | 7/1878 | Snell | 210/498 |
| 2,771,194 | 11/1956 | Baxter et al. | 210/416.1 |
| 4,282,094 | 8/1981 | Mitchell | 210/172 |
| 4,867,877 | 9/1989 | Hansen et al. | 210/416.1 |
| 4,959,146 | 9/1990 | Kristan | 210/258 |
| 5,104,529 | 4/1992 | Becker | 210/258 |
| 5,269,912 | 12/1993 | Shor | 210/416.1 |
| 5,417,851 | 5/1995 | Yee | 210/416.1 |

FOREIGN PATENT DOCUMENTS 776627 11/1996 European Pat. Off. .

*Primary Examiner*—Christopher Upton
*Attorney, Agent, or Firm*—Brown & Wood, LLP

[57] ABSTRACT

The present invention relates to a suction and discharge apparatus for a drilling fluid, which is used in material removing treatment of hard constructional components formed of concrete, stone, break work, and the like, and including at least two air- and liquid-tight reservoirs (1,2), with the first reservoir being connected with a vacuum-producing device (6) and a suction conduit (3), with the second reservoir (2) being connected with an overpressure-producing device (4) and a discharge conduit (4), and with both reservoirs (1, 2) being connected by a conduit (5).

7 Claims, 1 Drawing Sheet

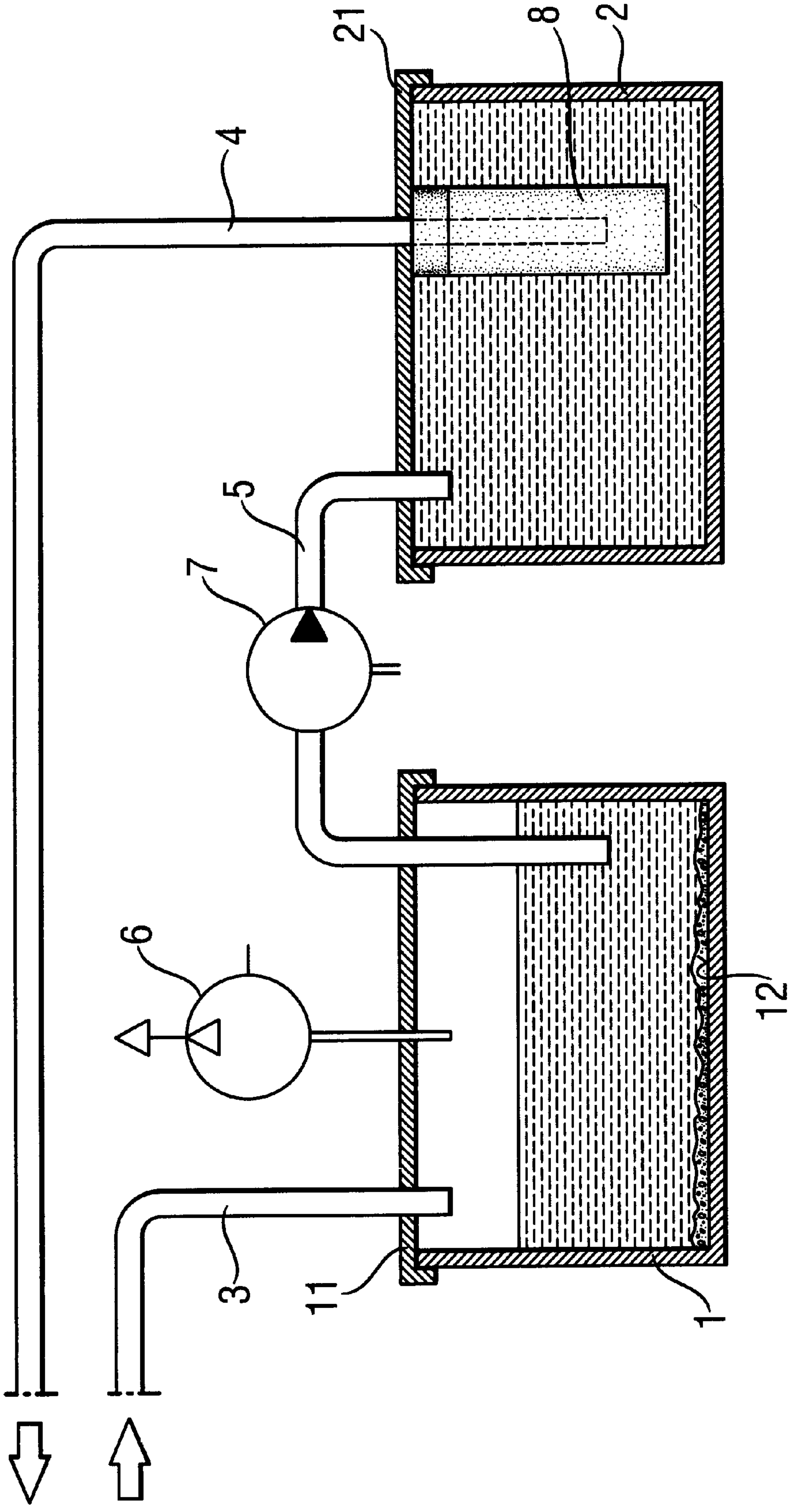
21
8
2
4
5
7
6
12
3
11
1

SUCTION AND DISCHARGE APPARATUS FOR DRILLING FLUID

BACKGROUND OF THE INVENTION

1. Field of the Invention

The present invention relates to a suction and discharge apparatus for a drilling fluid which is used in a material-removing treatment of hard constructional components formed of concrete, stone, brickwork, and the like, and including at least two airtight and liquidtight reservoirs, with the first reservoir being connected with a vacuum-producing device and a suction conduit, and with the second reservoir being connected with an overpressure-producing device and a discharge conduit.

2. Description of the Prior Art

Drilling fluids, preferably water, are used in treatment of hard constructional components formed, e.g., of concrete, stone, brickwork and the like, for cooling a working tool and for removal of drillings and the like produced during, e.g., forming a bore in a hard constructional component.

European Publication EP-0 776 627 discloses a suction and discharge apparatus for removing a drilling fluid, in which drillings or the like are dispersed, and for delivering a clean drilling fluid to a point of treatment. The disclosed apparatus includes two closed reservoirs, with a smaller reservoir being located in a larger reservoir. The larger reservoir cooperates with a vacuum-producing device. The produced vacuum provides for flow of the drilling fluid, together with drilling dispersed therein, through a suction conduit to the second reservoir. An overpressure-producing device and a discharge conduit provide for the delivery of a clean drilling fluid, which is located in the second reservoir, to the treatment point. Because both reservoirs have limited dimensions, a continuous filling of the smaller reservoir and a continuous draining of the larger reservoir, during the working process, is necessary. These measures not only increases the operational time but also adversely affects the handling of the apparatus.

Accordingly, an object of the present invention is to provide a suction and discharge apparatus for drilling fluids which permits to reduce the operational time and facilitates handling of the apparatus.

SUMMARY OF THE INVENTION

This and other objects of the present invention, which will become apparent hereinafter, are achieved by connecting the two reservoirs with a conduit.

The apparatus according to the present invention operates as a drilling fluid cleaning apparatus, with the first reservoir serving for precipitation of the drillings, and with the drilling fluid being delivered to the second reservoir through the connecting conduit a portion of which extending into the first reservoir is formed as a standpipe spaced from the bottom of the first reservoir. The clean drilling fluid is delivered from the second reservoir to a working point through a discharge conduit. Continuous filling of one reservoir and draining of the other reservoir is eliminated.

In order to achieve a predetermined flow velocity of the drilling fluid within the conduit, which connects the two reservoirs, an overpressure-producing device is arranged in the connecting conduit.

The overpressure-producing device produces vacuum in the portion of the connecting conduits which is located upstream of the device. This vacuum provides for suction of the drilling fluid from the first reservoir and for delivery of the drilling fluid to the overpressure-producing device. To prevent the drillings, which are accumulated on the bottom of the first reservoir, from reaching the second reservoir during suction of the drilling fluid from the first reservoir, advantageously, a portion of the conduit, which is located upstream of the overpressure-producing device, is formed as a standpipe spaced from the bottom of the first reservoir.

To provide for the flow of a clean drilling fluid through the discharge conduit, for further separation of the drillings and the drilling dust from the drilling liquid, a porous filter element is provided in the second reservoir upstream of the discharge conduit.

A particularly good filtering is achieved when, advantageously, the largest extent of the pores of the filter element amounts to from 0.1 $\mu$m to 10 $\mu$m.

To provide for good penetration of the drilling fluid through the filter element and to insure that the drillings, which still can be possibly contained in the drilling fluid, deposit on the outer surface of the filter element, advantageously, the size of the pores increases in the flow direction.

To provide for a better adherence of the drillings to the outer surface of the filter element, the filter element is preferably formed of ceramics.

A very good suction output is achieved when the vacuum-producing device produces a pressure from −0.1 to −1 bar.

Advantageously, the overpressure- producing device produces a pressure from 1 to 5 bar. With this pressure, a reliable flow of the drilling fluid from the first reservoir to the second reservoir and from the second reservoir through the filter element into the discharge conduit is achieved.

To reduce the mounting space, according to the present invention, the size of the second reservoir can be smaller than the size of the first reservoir, with the second reservoir being arranged in the first reservoir. With this arrangement likewise, a conduit connects both reservoir.

BRIEF DESCRIPTION OF THE DRAWINGS

The features and objects of the present invention will become more apparent, and the invention itself will be the best understood from the following detailed description for the preferred embodiment when read with reference to the accompanying drawings, wherein:

Single FIGURE shows a schematic view of a suction and discharge apparatus according to the present invention.

DETAILED DESCRIPTION OF THE PREFERRED EMBODIMENTS

A suction and discharge apparatus according to the present invention, which is shown in the drawing, includes two reservoirs 1 and 2 which are closed with respective covers 11 and 21. The first reservoir is connected with a device 6 for producing vacuum. The vacuum provides for suction of the drilling fluid, together with drillings dispersed therein, which are formed upon drilling of bores in hard constructional components formed of concrete, stone, brickwork, or the like. The drilling fluid is sucked from a bore through a suction conduit 3 and is delivered to the first reservoir 1. In the first reservoir 1, the drillings precipitate from the drilling fluid under the action of the gravitational forces and accumulate on a bottom 12 of the first reservoir 1.

The drilling fluid, which can possible still contain boring dust, continues to flow through a conduit 5, which connects the two reservoirs 1 and 2, and a device 7 for producing overpressure, which is arranged in the conduit 5, into the second reservoir 2. In order to prevent the drillings, which are accumulated on the bottom 12 of the first reservoir from penetrating into the second reservoir 2, a portion of the conduit 5, which extends into the first reservoir 1, is formed as a standpipe the free end of which is spaced from the bottom 12.

A porous filter element 8 is attached to the cover 2 of the second reservoir 2. The drilling fluid flows from the second reservoir through the filter element 8 and a discharge conduit 4 back to the bore location. The drillings, which could have possibly remained in the drilling fluid, become adhered to the outer surface of the filter element 8, so that only clean drilling fluid reaches the discharge conduit 4.

In order to prevent the backflow of the drilling fluid from the second reservoir 2 which, e.g., is subjected to a pressure of 3 bar, into the first reservoir 1, a check valve (not shown) can be arranged in the conduit 5 upstream of the device 7 for creating overpressure.

The vacuum-producing device 6 can be formed, e.g., as a vacuum pump or a suction pump. The overpressure-producing device 7 can be formed, e.g., as a regenerative impeller pump provided with an insulated drive formed as an electric motor. It is also possible, e.g., to provide a single electric motor for driving both the vacuum-producing device 6 and the overpressure-producing device 7.

Though the present invention was shown and described with references to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A suction and discharge apparatus for a drilling fluid used in material-removing treatment of hard constructional components, comprising:

at least two air- and liquid-tight reservoirs;

suction conduit means connected with one of the at least two reservoirs for delivering drillings-containing drilling fluid into the one of the at least two reservoirs;

discharge conduit means connected with another of the at least two reservoirs for discharging a clean drilling fluid from the another of the at least two reservoirs;

a vacuum-producing device connected with the one of the at least two reservoirs for producing vacuum in the one of the at least two reservoir to provide for suction of the drillings-containing drilling fluid into the one of the at least two reservoirs;

a conduit for connecting the at least two reservoirs; and an overpressure-producing device arranged in the connecting conduit in order to provide for a flow of the cleaned drilling fluid from the one of the at least two reservoir into another of the at least two reservoirs and for creating an overpressure in the another of the at least two reservoirs to provide for a flow of the cleaned drilling fluid from the another of the at least two reservoirs into the discharge conduit means, the overpressure-producing device producing an overpressure of from 1 bar to 5 bar in the another of the at least two reservoirs.

2. An apparatus according to claim 1, wherein a portion of the connecting conduit (5), which is located upstream of the overpressure-producing device (7) and which projects into the one reservoir (1), is formed as a standpipe a free end of which is spaced from a bottom (12) of the one reservoir (1).

3. An apparatus according to claim 1, further comprising a porous filter element (8) located in the another (2) of the at least two reservoirs (1, 2) and arranged upstream of the discharge conduit means (4).

4. An apparatus according to claim 3, wherein a largest extent of pores of the filter element (8) amounts to from 0.1 μm to 10 μm.

5. An apparatus according to claim 4, wherein the size of the pores increases in a flow direction.

6. An apparatus according to claim 3, wherein the filter element is formed of ceramics.

7. An apparatus according to claim 1, wherein the vacuum-producing device (6) provides a pressure from −0.1 to −1 bar.

* * * * *

UNITED STATES PATENT AND TRADEMARK OFFICE

CERTIFICATE OF CORRECTION

PATENT NO. : 6,126,822

DATED : October 3, 2000

INVENTOR(S) : Peter Ostermeier, et al

It is certified that error appears in the above-identified patent and that said Letters Patent is hereby corrected as shown below:

On the title page:

{75} Inventors:

Peter Ostermeier, Diessen, Wolfgang Erdt, Martinsried both of Germany; Peter Roth, Grabs, Switzerland

Signed and Sealed this

First Day of May, 2001

*Attest:*

NICHOLAS P. GODICI

*Attesting Officer* *Acting Director of the United States Patent and Trademark Office*